CONTOURED ONE-PIECE HANGER

Original Filed Feb. 13, 1967 2 Sheets-Sheet 1

INVENTOR.
JOHN H. BATTS
BY Price, Heneveld
Huizenga & Cooper
ATTORNEYS

CONTOURED ONE-PIECE HANGER

Original Filed Feb. 13, 1967 2 Sheets-Sheet 2

INVENTOR.
JOHN H. BATTS
BY Price, Heneveld
Huizenga & Cooper
ATTORNEYS

United States Patent Office

Re. 26,949
Reissued Sept. 8, 1970

26,949
CONTOURED ONE-PIECE HANGER

John H. Batts, Grand Rapids, Mich., assignor to John Thomas Batts, Inc., Zeeland, Mich., a corporation of Michigan Original No. 3,406,881, dated Oct. 22, 1968, Ser. No. 615,733, Feb. 13, 1967. Application for reissue Feb. 18, 1970, Ser. No. 12,162
Int. Cl. A47j *51/08*
U.S. Cl. 223—88 3 Claims

Matter enclosed in heavy brackets [ ] appears in the original patent but forms no part of this reissue specification; matter printed in italics indicates the additions made by reissue.

ABSTRACT OF THE DISCLOSURE

An integrally moulded garment hanger having an enlarged header portion, a support element associated with the header portion, a pair of diverging legs extending downwardly and outwardly from the sides of the header portion, each of the legs extending forwardly from and out of the general plane of the header portion, and a trouser bar connecting the extremities of each of the legs. The entire structure, with the exception of the support element, may be integrally moulded in a two-piece mould structure opening by simple movement of the mould valves in opposite directions. This is permitted by displacing all upwardly facing segments of the header portion, legs and bar either laterally aligned or forwardly offset with respect to one another. In this manner, the hanger may be moulded with hollow, shell-like components while still permitting vertical opening of the mould members for removal of the hanger.

Background

The manufacturers of garment hangers were traditionally limited to such materials as wood, metal and the like in the manufacture of their products. With the advent of plastic and, particularly, plastic moulding processes, however, a new structural material became available to them which offered many advantages. It was lighter in weight, relatively inexpensive, structurally sound and required little or no finishing separate from the moulding process per se. By properly designing the moulds, garment hanger manufacturers have been able to produce hangers conforming generally to the contour of the shoulder section of a suit, coat or the like whereon garments could be hung for long periods of time without fear of their becoming wrinkled, stretched and the like from portions of the hanger protruding unnaturally into them.

While such moulded plastic hangers have been widely accepted in the industry, one problem which has consistently plagued manufacturers is the attachment of the trouser supporting bar to the header and leg sections of the hanger. The problem stems, primarily, from the desirability of moulding the header and leg sections such that they are hollow, shell-like structures having generally non-visible openings in ordinary usage. The hollowing of these sections, of course, markedly reduces the amount of plastic required to mould a particular hanger configuration and, additionally, inherently reduces the weight of the resulting item. In fact, only by so constructing the hanger can the structural and economic advantages of plastic, as opposed to wood, for example, be fully realized.

In the past, it has been customary to suspend the trouser bar from the opposing extremities of the legs by, for example, forming a plug receiving surface in each leg extremity during the moulding of the header and leg assembly and providing the trouser bar with a pair of plugs at each extremity adapted to force fit into these apertures. Similar procedures have also been utilized. Insofar as applicant is aware, however, no hanger has ever been produced embodying both the shoulder-conforming concept of the forwardly curved legs with respect to the header portion and an integrally moulded trouser supporting bar. While such an integrally moulded bar is a relatively obvious expedient towards reducing manufacturing costs, any previously designed hanger embodying such a component has been incapable of being removed from a relatively inexpensive two-piece mould after moulding and therefore, useless.

Objects and specification

It is an object of this invention, therefore, to provide a hanger structure which permits complete capitalization on the structural and economic advantages afforded by utilizing plastic as a manufacturing material.

More particularly, it is an object of this invention to provide a garment hanger having an integrally moulded trouser supporting bar so structurally interrelated with the remainder of the hanger as to permit removal of the entire component from the mould with relative ease.

It is another object of this invention to provide such a hanger structure wherein material costs are minimized by providing shell-like structural configurations throughout.

Basically, then, it is an object of this invention to provide a garment hanger having generally apparel-conforming header and leg sections and a trouser bar integrally moulded therewith which is structurally designed so as to permit the moulding thereof in a one-step operation with relative ease.

These as well as other objects of this invention will become readily apparent by reference to the following specification and accompanying figures in which.

Figure 1:
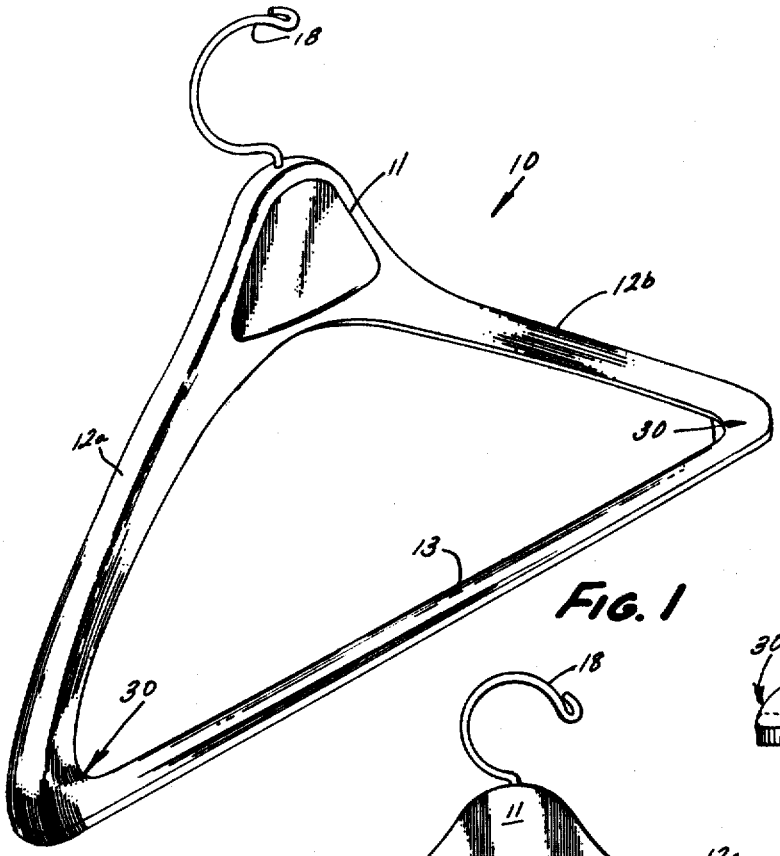
FIG. 1 is a perspective view of the novel garment hanger.
Figure 3:
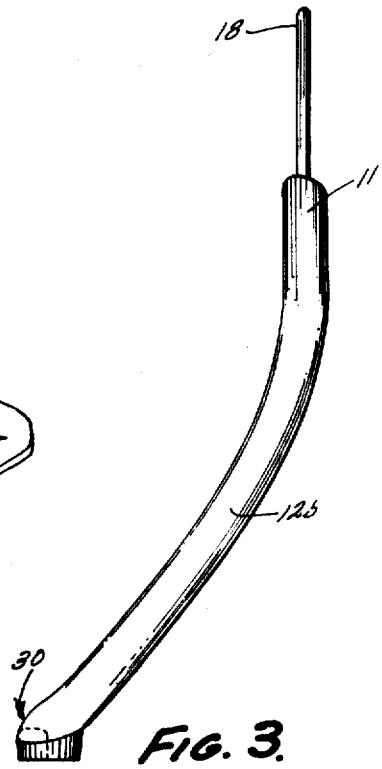
FIG. 3 is a side-elevational view.
Figure 2:
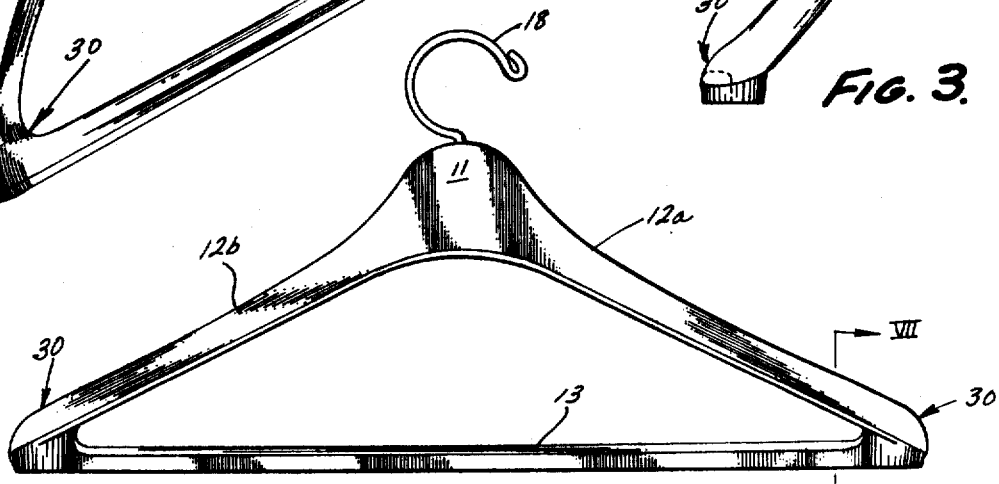
FIG. 2 is a rear-elevational view.
Figure 4:
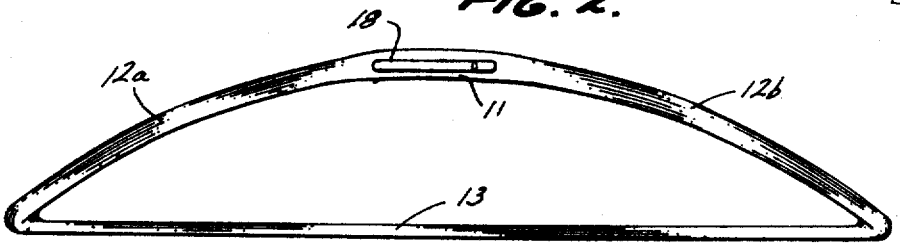
FIG. 4 is a plan view.
Figure 5:
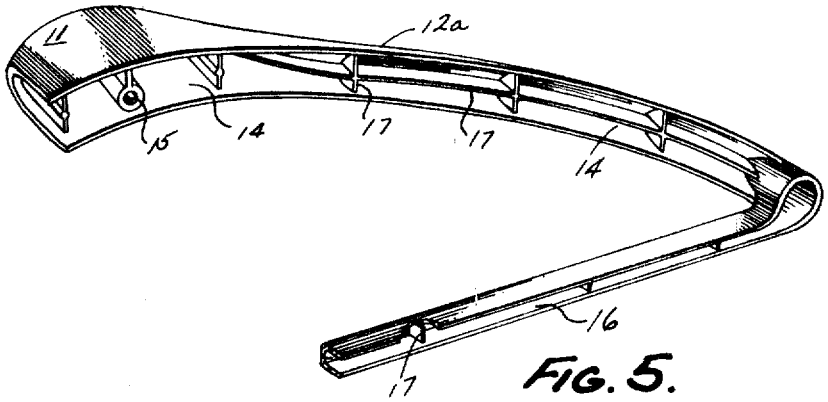
FIG. 5 is a fragmentary perspective view illustrating the ordinarily non-visible portions of the structure.

Briefly, this invention relates to a garment hanger having an enlarged header portion, a support element associated with the header portion and a pair of diverging legs extending downwardly and outwardly from the sides of the header portion. The legs extend, also, forwardly from and out of the general plane of the header portion in order to provide the apparel-conforming shoulder sections so widely accepted in the industry. The trouser bar is integrally moulded with the extremities of each of the legs in such a manner that upwardly facing segments of the header portion, legs and bar are either vertically aligned or forwardly offset with respect to one another whereby the hanger may be integrally moulded between two vertically separable mould members.

Referring now to the figures, a preferred embodiment of this invention will be described in detail. Referring initially to FIGS. 1 through 5 and 7, the novel garment hanger, indicated generally by the reference numeral 10, comprises an enlarged header portion 11 from which extends legs 12a and 12b in diverging fashion. As shown best in FIG. 4, legs 12a and 12b extend downwardly and outwardly from the sides of the header portion and, additionally, forwardly from and out of the general plane of the header portion to provide a generally apparel-conforming upward configuration.

Suspended between the extremities of the legs 12a and 12b at transitional sectors 30 is the trouser supporting bar 13. The mould is designed such that the interiors of the header and leg portions 11 and 12 are generally hollow shells as indicated at 14 with suitable reinforcing ribs 17 as necessary. Similarly, the trouser bar 13 has a shell-like configuration, generally curved in cross section, opening downwardly as indicated at 16. The reinforced support element receiving aperture is incorporated into the hanger structure during the moulding process.

Figure 6:
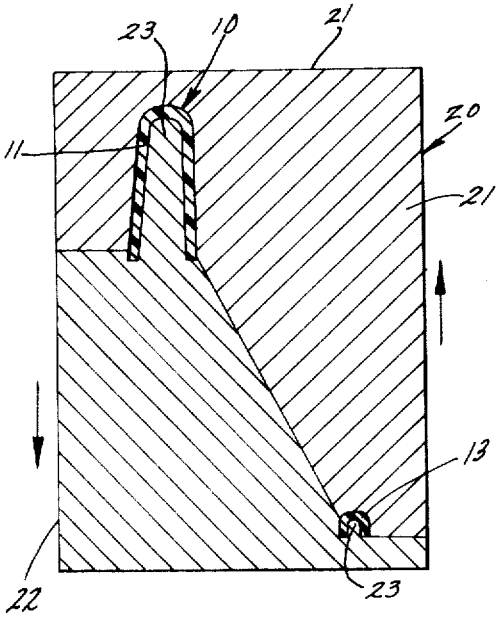
FIG. 6 is a cross-sectional view illustrating the formation of the hanger structure in a typical two-piece mould assembly.
Figure 7:
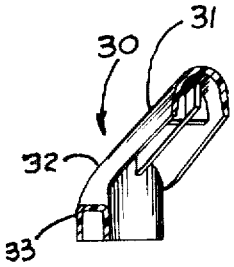
FIG. 7 is a cross-sectional view taken along plane VII—VII of FIG. 2.

Referring now additionally to FIG. 6, a suitable mould structure 20 comprising an upper section 21 and a lower section 22 is illustrated for forming the hanger structure which is the subject of this invention. The lower mould section 22 has the male portions 23 which form the hollow sections 14 and 16 in the legs, header and trouser supporting bar. The two sections of the mould are placed together and the plastic injected thereinto in well-known fashion. From an examination of FIGS. 4, 6 and 7, it will be noted that the mould construction is such that the trouser bar 13 is disposed forwardly from the header and leg portions of the upper structure in order to permit separation of the mould members 21 and 22 after the completion of the moulding process. After the top section 21 is removed, the completed hanger may be removed from the lower mould section 22 with relative ease.

In order to fully appreciate the advantages of applicant's particular structure, it is necessary to consider the problems encountered in attempting to mould a garment hanger with either horizontal or vertically separating moulds embodying both the forwardly and outwardly sweeping legs and the hollow sections 14 and 16. Only by positioning the various structural components of the hanger with respect to one another in such a manner that all upwardly facing segments of the header portion, the legs and the trouser bar are laterally aligned or forwardly offset with respect to one another can the mould be separated without damaging the moulded hanger subsequent to the injection moulding process. Thus, the transitional areas 30, so denoted since it is somewhat difficult to establish positively where the legs 12 terminate and the trouser supporting bar 13 begins, curve downwardly at 31, forwardly at 32 and inwardly at 33 (see FIG. 7) in such a manner that the upper mould section 21 may be removed vertically therefrom subsequent to the injection process without fouling against any of the under structure of the legs 12 or the header 11. Thus, as viewed in FIG. 4, the trouser supporting bar 13 is disposed forwardly from the super structure of the hanger.

The advantages of the instant invention will be readily apparent to those skilled in the art. The hanger may now be integrally moulded in a one-step operation and the previous labor consuming steps of affixing the trouser bar thereto subsequent to moulding eliminated. This is accomplished without comprising the favorable characteristics of plastic structural materials and, additionally, while keeping the amount of such materials required for a particular hanger at a minimum.

While a preferred embodiment of this invention has been illustrated in detail, it will be readily apparent to those skilled in the art that many other embodiments may be conceived and fabricated without departing from the spirit of this specification and the accompanying drawings. Such other embodiments are to be deemed as included within the scope of the following claims.

I claim:

1. A *body for a* garment hanger adapted to be suspended from a support, said [hanger] *body* comprising:

an enlarged header portion;

*said header portion having means for securing* a support engaging element [associated with said header portions] *thereto*; said header portion lying in a generally vertical plane when said [hanger] *body* is suspended from [said] *a* support *engaging element*;

a pair of diverging legs extending downwardly and outwardly from the sides of said header portion, each of said legs extending forwardly from and out of the general plane of said header portion, each of said legs and header portion being generally hollow shells opening downwardly;

a trouser bar connecting the extremities of each of said legs, said trouser bar, legs and header portion being integrally moulded from plastic as one piece, the extremities of said bar extending inwardly with respect to the extremities of said legs and being offset forwardly with respect to all segments of said legs thereabove, the remainder of said bar being displaced forwardly from all segments of said header portion and legs whereby said [hanger] *body* can be moulded in a two-piece mould.

2. The *body for a* hanger as set forth in claim 1, wherein said bar is a generally hollow shell opening generally downwardly.

3. *A body for a garment hanger adapted to be suspended from a support, said body comprising:*

*an enlarged header portion;*

*said header portion having means for securing a support engaging element thereto; said header portion lying in a generally vertical plane when said body is suspended from a support engaging element;*

*a pair of diverging legs extending downwardly and outwardly from the sides of said header portion, each of said legs being curved and extending forwardly from and out of the general plane of said header portion, each of said legs and header portion being generally hollow shells opening downwardly;*

*a trouser bar connecting the extremities of each of said legs, said trouser bar, legs and header portion being integrally moulded from plastic as one piece, a transition portion at the end of each of said legs, continuous with and following the curvature of said legs, the extremities of said bar being integral with the inner face of said transition zone and all portions of said bar extending inwardly with respect to the extremities of said legs and being offset forwardly with respect to all segments of said legs and header portion thereabove, whereby said body can be moulded in a two-piece mould.*

References Cited

The following references, cited by the Examiner, are of record in the patented file of this patent or the original patent.

UNITED STATES PATENTS

| | | | |
|---|---|---|---|
| Re. 25,841 | 8/1965 | Gingher | 223—88 |
| D. 136,082 | 8/1943 | Schreiber. | |
| 2,991,919 | 7/1961 | Zuckerman | 223—88 |
| 3,306,506 | 2/1967 | Batts | 223—88 |

FOREIGN PATENTS

| | | |
|---|---|---|
| 296,974 | 5/1954 | Switzerland. |
| 751,228 | 6/1933 | France. |
| 1,174,029 | 1/1965 | Germany. |

PATRICK D. LAWSON, Primary Examiner

G. H. KRIZMANICH, Assistant Examiner